(12) United States Patent
Sporton et al.

(10) Patent No.: US 10,341,861 B2
(45) Date of Patent: Jul. 2, 2019

(54) NETWORK SIGNALLING MESSAGE VERIFICATION

(71) Applicant: Vodafone IP Licensing Limited, Berkshire (GB)

(72) Inventors: Simon Sporton, Berkshire (GB); Oliver Sauder, Berkshire (GB); Ratnanandan Ganeshanandan, Berkshire (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 14/609,525

(22) Filed: Jan. 30, 2015

(65) Prior Publication Data

US 2015/0223065 A1 Aug. 6, 2015

(30) Foreign Application Priority Data

Jan. 31, 2014 (EP) .................................... 14153474

(51) Int. Cl.
*H04W 4/12* (2009.01)
*H04L 29/06* (2006.01)
*H04W 12/06* (2009.01)
*H04W 12/10* (2009.01)
*H04W 12/12* (2009.01)
*H04W 84/04* (2009.01)

(52) U.S. Cl.
CPC ......... *H04W 12/06* (2013.01); *H04L 63/0236* (2013.01); *H04W 4/12* (2013.01); *H04W 12/10* (2013.01); *H04L 63/126* (2013.01); *H04W 12/12* (2013.01); *H04W 84/042* (2013.01)

(58) Field of Classification Search
CPC ....... H04W 12/06; H04W 4/12; H04W 12/10; H04W 84/042; H04L 63/0236; H04L 63/126
USPC ........................................................ 455/411
See application file for complete search history.

(56) References Cited

U.S. PATENT DOCUMENTS

| 7,218,613 | B1 | 5/2007 | Doskow et al. |
| 7,239,866 | B2 | 7/2007 | Cai et al. |
| 2005/0232236 | A1* | 10/2005 | Allison ................ H04Q 3/0025 370/352 |
| 2006/0104247 | A1* | 5/2006 | Dommety ......... H04L 29/12216 370/338 |

(Continued)

FOREIGN PATENT DOCUMENTS

EP 2 204 955 7/2010

OTHER PUBLICATIONS

Office Action dated Sep. 9, 2016 in corresponding European Application No. 14153474.3.

(Continued)

*Primary Examiner* — Shahriar Behnamian
(74) *Attorney, Agent, or Firm* — B. Aaron Schulman, Esq.; Stites & Harbison, PLLC.

(57) ABSTRACT

A received network signalling messages in a Public Land Mobile Network (PLMN) comprises a routeing part and an instruction part, each of the routeing part and the instruction part comprising a respective message address. These are handled by: authenticating the received network signalling message on the basis of the message address of the routeing part and the message address of the instruction part; and processing the received network signalling message based on the authentication.

12 Claims, 1 Drawing Sheet

(56) References Cited

U.S. PATENT DOCUMENTS

| | | | |
|---|---|---|---|
| 2006/0135133 A1* | 6/2006 | Cai | H04L 12/585 455/414.1 |
| 2010/0105355 A1* | 4/2010 | Nooren | H04L 63/20 455/410 |
| 2010/0112993 A1* | 5/2010 | Peng | H04W 12/12 455/415 |

OTHER PUBLICATIONS

European Search Report dated Aug. 1, 2014 in corresponding European Patent Application No. 14 15 3474.

* cited by examiner

NETWORK SIGNALLING MESSAGE VERIFICATION

TECHNICAL FIELD OF THE INVENTION

The invention relates to a network entity for a Public Land Mobile Network (PLMN) and a method for handling a received network signalling message in a PLMN.

BACKGROUND TO THE INVENTION

In cellular networks, network signalling messages are regularly used between a visitor registration entity, such as a Visitor Location Register (VLR) and a home registration entity, such as a Home Location Register (HLR). In particular, Supplementary Service (SS) messages can be used to interrogate and/or modify a subscriber's settings on the home registration entity. For example, the mobile application part (MAP) of the Signalling System 7 (SS7) suite is particularly used for this purpose in GSM and UMTS cellular networks. Typically, such operations are generated by the visitor registration entity in response to a subscriber's User Equipment (UE).

It is recognised that such network signalling messages have a low level of security. As a result, it is possible for a third party (which could be an attacker) to imitate such network signalling messages. This may allow them to perform full supplementary service control associated with a victim's subscription. For example, this could include: checking call forwarding settings; deactivating services (such as calling line identification presentation); and activating an unconditional call forward, effectively intercepting all calls to the subscriber.

In current systems, such network signalling messages require an individual subscriber identity, typically an International Mobile Subscriber Identity (IMSI), to be communicated in order to make use of the interrogation and modification functionality. However, this information can be obtained by the imitator simply by making a request of the HLR. Such a request generally results in a response message, comprising the IMSI and the address for the VLR.

In view of this, one main solution to this issue is to deal with the response provided by the HLR. One solution may be to hide the subscriber's true IMSI, for example by use of an SMS home network routeing approach. Examples of such solutions have been marketed by a range of companies. However, this may not provide complete protection, since there may be other methods for determining the IMSI, both directly using the GSM MAP protocol, or indirectly, for example via the management systems of the network operator.

It is therefore desirable to provide some authentication of the network signalling message. A number of solutions have been proposed to achieve this. One option is to use a Transaction Capabilities Application Part (TCAP) handshake protocol, for example as described in 3GPP TS 33.204 Annex D. This is intended to ensure the authenticity of incoming dialogues, by transmitting a first message in the dialogue as empty and providing the payload only in subsequent TC-CONTINUE messages. These may include transaction IDs allocated by the receiving node, which may guarantee the originating address is not imitated. However, commercial agreements may need to be made with roaming partners in order to implement such a solution. Moreover, the protection may only be provided when it is implemented with all roaming partners.

Another approach uses TCAPsec as described in 3GPP TS 33.204. This is similar to TCAP handshake and suffers from the same problems, in which benefits may only be achieved when all roaming partners implement the functionality.

U.S. Patent Publication No. 2010/0105355 describes an alternative solution. A proxy is provided between a VLR and HLR. The proxy receives an Unstructured Supplementary Service Data (USSD) message, which provides an IMSI for the subscriber. The proxy routes the message to another network entity, which queries the HLR for the serving VLR address of the UE identified by the IMSI. The network entity then compares the serving VLR address with the originating VLR address, which is also identified in the USSD message. When these addresses are different, the USSD message is identified as a spoof (that is, imitation). This is a complex solution, including an additional node in the message path and places further burden on the HLR directly.

An improved solution is therefore desirable. Preferably, such a solution need not necessitate all roaming partners from using the functionality, nor should it place a significant burden on the HLR.

SUMMARY OF THE INVENTION

Against this background, the present invention provides a network entity for a Public Land Mobile Network (PLMN) comprising: a request input, arranged to receive a network signalling message; verification logic, configured to authenticate the received network signalling message; and a message processor, configured to process the received network signalling message based on the authentication of the verification logic. The network signalling message comprises a routeing part and an instruction part, each of the routeing part and the instruction part comprising a respective message address. The verification logic is configured to authenticate the received network signalling message on the basis of the message address of the routeing part and the message address of the instruction part.

Thus, the network entity uses both the message address of the routeing part and the message address of the instruction part in authenticating the message. The use of both parts of the message means that the burden on the network entity, which may be part of the home registration entity (such as HLR) or ancillary to such a home registration entity may be reduced.

Typically, each of the message routeing parts and the instruction parts are in different layers of a protocol stack. In particular, the instruction part is normally on a higher layer of the protocol stack than the routeing part. For example, the message routeing part may be on a Network layer of the protocol stack. The instruction part may be on a presentation or application layer of a protocol stack. In the preferred embodiments, the routeing part uses the Signalling Connection Control Part (SCCP) protocol. Additionally or alternatively, the instruction part may use the Transaction Capabilities Application Part (TCAP) protocol. Other Signalling System 7 (SS7) protocols, including Mobile Application Part (MAP) protocol may be used. Alternatively, other signalling protocols can be used for different kinds of PLMN.

The message addresses of the routeing part and the instruction part are each typically an address provided for routeing or identification purposes (or both). Normally, one or both of the message addresses for the respective routeing and instruction parts are intended to identify an originator of the message, return address for the message or both (which may generally be termed an originating address). In some embodiments, one or both of the message addresses for the respective routeing and instruction parts may be intended to identify the mobile subscriber to which the message relates (which may generally be termed a destination address). Where the routeing part uses the SCCP protocol, the related message address may be the Calling Global Title (CgGT). The message address in the routeing part may identify the return address to which the response message will be sent. Where the instruction part uses a TCAP protocol, for example within the 'MAP-Openinfo' information element, the message address may be the Originating Entity (OE) address. The message address in the instruction part is typically the address of the visitor registration entity (for example, VLR) and this may even be true in imitated network signalling messages.

The verification logic may be configured to authenticate the received network signalling message in different ways, using both the message address of the routeing part and the message address of the instruction part. For example, it may be configured to compare the message address of the routeing part with the message address of the instruction part. The message address of the routeing part (which may be the CgGT where SCCP is used) is normally the return address to which the response message will be sent. The message address of the instruction part may be used by the home registration entity (such as HLR) to identify the visitor registration entity (such as VLR) to which the subscriber is currently registered. It is expected that such network signalling messages originate from this visitor registration entity. If the request is genuine, the two addresses should therefore match. Thus, authentication may be possible by comparing the message address of the routeing part with the message address of the instruction part.

The network signalling message may identify a mobile subscriber to which the network signalling message relates. This may be termed a destination address, as noted above. In embodiments, this is by means of a subscriber identity, for example an International Mobile Subscriber Identify (IMSI). Other subscriber identities may be used, for example a Mobile Subscriber ISDN (MSISDN) identity.

An imitated network signalling message will normally use a message address of the routeing part that will have no relationship to the victim subscriber. This can be used as another technique for authentication, which may be employed in additional or as an alternative to the approach discussed above. The verification logic may be configured to determine at least one database message address associated with the identified mobile subscriber. In this case, the verification logic may be further configured to authenticate the received network signalling message, by comparing the message address of the routeing part and the message address of the instruction part with the at least one database message address. By checking both addresses against the at least one database address, the message security is significantly improved in a straightforward way.

The database message address or addresses may be determined from the home registration entity or another network entity in the Home PLMN (HPLMN) part of the cellular network's Core Network. The network entity may be configured to obtain the at least one database message address from a database, which may be within or external to the network entity. Typically, the at least one database message comprises an address for a visitor registration entity (such as VLR) with which the identified mobile subscriber is registered. However, the at least one database message address can comprise other addresses. For example, the at least one database message address may comprise an address for each of one or more authorised service nodes. Thus, the network entity can confirm that the message address used in the routeing part and the instruction part matches the information stored at the home registration entity or alternative databases. This may be a relatively straightforward mechanism for authentication.

In the preferred embodiments, the verification logic is configured to provide a pass output if the received network signalling message is authenticated and to provide a fail output if the received network signalling message is not authenticated. The message processor may be configured to act in accordance with the output of the verification logic. For example, the message processor may be configured to discard the received network signalling message if the verification logic provides a fail output. This may have benefits, because it may avoid the originator of the imitated network signalling message from discovering that the imitation has been identified in the PLMN. If the imitator is an attacker, this may allow the attacker to be identified without being alerted. Alternatively, the message processor may be configured to send a further message to the message address of the routeing part of the received network signalling message if the verification logic provides a fail output. For example, such a further message may comprise a TC-ABORT message.

In embodiments, the network signalling message may be an Unstructured Supplementary Service Data (USSD) message. In some embodiments, the network signalling message may be an interrogation message for a home registration entity of the PLMN, such as a HLR. In particular, the network signalling message may be an InterrogateSS message of a MAP protocol. In the preferred embodiment, the network entity of the invention is a HLR. However, in other embodiments, the network entity may be an entity separate from the HLR, although this is not preferred. The network entity is preferably in the HPLMN. In alternative embodiments, the network entity may be in a transit network, for example on behalf of the PLMN.

In a second aspect, there is provided a method for handling a received network signalling message in a PLMN. The network signalling message comprises a routeing part and an instruction part, each of the routeing part and the instruction part comprising a respective message address. The method comprises: authenticating the received network signalling message on the basis of the message address of the routeing part and the message address of the instruction part; and processing the received network signalling message based on the authentication.

Method steps comprising corresponding with the functionality described in respect of the network entity of the first aspect may equivalently be optionally applied to the method of the second aspect. Moreover, optional method features of the second aspect are now described and features of the network entity of the first aspect may optionally be provided corresponding with these.

For example, prior to the step of authenticating, the method may further comprise: receiving a signalling request message, comprising a first identifier for a mobile subscriber, which is preferably a MSISDN. Then, the method may further comprise determining further information in respect to the mobile subscriber identified by the first identifier. The method may yet further comprise communicating the determined further information to an originator of the received signalling request message.

The signalling request message is advantageously a different message from the network signalling message and precedes it. For example, it may be a MAP message or USSD message. In particular, the signalling request message may be a Send Routeing for Short Message Operation (SRI-SM req) message. The first identifier for the mobile subscriber may be a MSISDN. The determined further information may comprise one or both of: a second identifier for the mobile subscriber (such as a IMSI) identified by the first identifier; and an address for visitor registration entity with which the mobile subscriber identified by the first identifier is registered (such as a VLR address).

There is further provided a computer program, configured to carry out the method of the second aspect when operated on a processor.

The skilled person will appreciate that combinations of any specific features described herein are also provided, even if not explicitly disclosed. These may be combinations of the features described with respect to the first aspect alone or combinations of the features with respect to the second aspect alone or combinations of features described with respect to the first aspect and features described with respect to the second aspect.

BRIEF DESCRIPTION OF THE DRAWINGS

The invention may be put into practice in various ways, one of which will now be described by way of example only and with reference to the accompanying drawings in which.

DETAILED DESCRIPTION OF A PREFERRED EMBODIMENT

Figure 1:
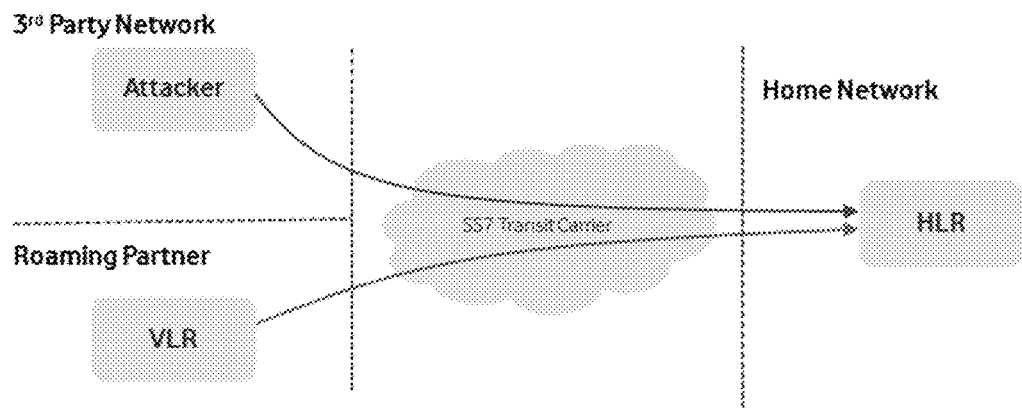
FIG. 1 shows a schematic illustration of the communication between different cellular networks.

Referring first to FIG. 1, there is shown a schematic illustration of the communication between different cellular networks. This is described with reference to a GSM cellular network architecture, but it will be understood that other types of cellular network architecture may operate in similar ways. The present invention may be applicable to various different forms of cellular network architecture.

There are two main factors in allowing a party unconnected with either the victim (that is, the subscriber whose HLR data is being viewed or modified by the party) or the Home PLMN to imitate a network signalling (such as SS7, MAP) message to the HLR.

A first factor stems from the use by GSM operators of transit carriers to reach roaming partners. The originator of an imitated network signalling message (which will be referred to as an attacker, although the motive of the originator need not be to attack) is in a third party network. The User Equipment (UE) whose network signalling messages are being imitated is typically registered with a VLR in a roaming partner network. Network signalling messages from both the third party network and the roaming partner network pass through an SS7 transit carrier to the HLR in the home network. The use of transit carriers opens the opportunity for an attacker to imitate messages towards the home network, so that they look like they originated from the roaming partner.

A second factor in the abuse of MAP operations towards the HLR is that supplementary service control operations are addressed by the customer's IMSI. This is reasonably easy to obtain. The known relevant MAP services are: MAP-REGISTER-SS; MAP-ERASE-SS; MAP-ACTIVATE-SS; MAP-DEACTIVATE-SS; MAP-INTERROGATE-SS; MAP-REGISTER-PASSWORD; MAP PROCESS-UN-STRUCTURED-SS-REQUEST; MAP-UNSTRUC-TURED-SS-REQUEST; MAP-UNSTRUCTURED-SS-NOTIFY; MAP-REGISTER-SS-ENTRY; and MAP-ERASE-CC-ENTRY.

Figure 2:
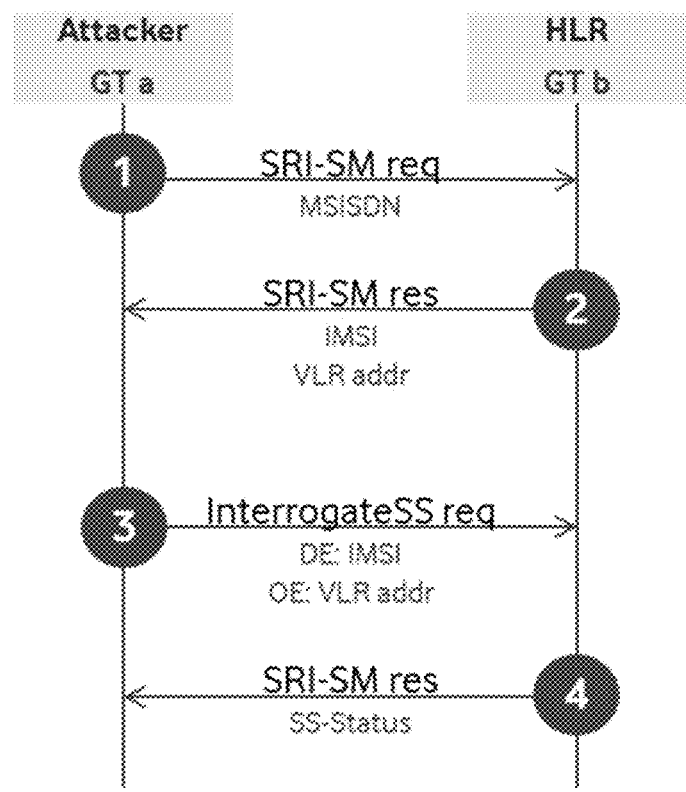
FIG. 2 schematically depicts communication of an imitated network signalling message between a third party and a HLR in a PLMN.

Referring now to FIG. 2, there is a schematic depiction of communication of an imitated network signalling message between a third party and an HLR in a PLMN. This is an example of the use of InterrogateSS to view a target customer's supplementary service data. However, other MAP services can be used to modify the information held on the HLR or make USSD commands, such as obtaining pre-pay balance information.

In step 1, the attacker sends a "Send Routeing for Short Message" operation request (SRI-SM req) towards the HLR. This includes the MSISDN of the target subscriber. In step 2, the HLR returns various information, including the subscriber's IMSI and the address of the VLR that is currently providing service to that subscriber. In so doing, the HLR provides the attacker with the information needed to begin an attack. However, the attacker could obtain this information in other ways, especially if this route were blocked.

In step 3, the attacker sends a specially formatted InterrogateSS operation. At the SCCP layer of the protocol stack for the message, they continue use their own Global Title ("GT a" in this example). This is the return address to which the response message will be sent. At the TCAP layer (within the "MAP-OpenInfo" information element), they imitate the Originating Entity (OE) address of the VLR. This address was provided to them in step 2.

In step 4, the HLR uses the destination entity reference provided in step 3 to index the subscriber's entry in the HLR. It then returns the status of the requested service.

In accordance with the disclosure, an additional step is provided between steps 3 and 4. The HLR should not simply accept the request message. Rather, the addresses provided at the SCCP and TCAP layers should be checked. In particular, two tests are performed:

1. the SCCP calling party address is either: a) an address for the subscriber's current VLR (as stored on the HLR); or b) an address for an authorised service node; and
2. the TCAP originating entity address matches the subscriber's VLR address.

If either of these criteria are not passed, the HLR should either: a) silently discard the request message; or b) fail the request message using a TC-ABORT message.

This procedure should have the effect that all supplementary service messages received at the HLR can be authenticated to have originated from the VLR serving the subscriber identified (or come from some other authorised service node). Even if the subscriber's IMSI has been revealed to the attacker, the technique described above can still prevent an imitated message. Moreover, by using both the SCCP calling party address and TCAP originating entity in the authentication process, security and efficiency has been improved.

Although a specific embodiment has now been described, the skilled person will appreciate that variations and modifications are possible. The specific messages may differ from those defined above and indeed network signalling protocols other than MAP and USSD may be secured in accordance with the disclosure.

Other ways of checking both the SCCP GT (or equivalent) and TCAP OE (or equivalent) may be possible. A simplest approach may be to compare both addresses and, if they match, the message may be authenticated. The skilled person will immediately identify other possible checks.

Moreover, the network architecture may be varied, such that the message is not sent to an HLR, but another message. Also, the checking process may take place at another network entity, not the HLR. For example, a proxy may be used to provide a firewall. This will potentially be of less interest, because it may require communication between the proxy and the HLR, in order to access the HLR database.

The invention claimed is:

1. A network entity for a Public Land Mobile Network, PLMN, comprising:
   a request input, arranged to receive a network signaling message, the network signaling message comprising a routeing part and an instruction part that are on different layers of a protocol stack, each of the routeing part and the instruction part including a respective message address therewithin, the instruction part of the network signaling message using a Transaction Capabilities Application Part, TCAP, protocol;
   verification logic, configured to authenticate the received network signaling message based on the message address included within the routeing part and the message address included within the instruction part to determine whether the network signaling message is an imitation; and
   a message processor, configured to process the received network signaling message based on the authentication of the verification logic, and
   wherein the verification is configured to perform at least one of:
      authenticating the received network signaling message by comparing the message address included within the routeing part with the message address included within the instruction part, and
      determining, where the network signaling message identifies a mobile subscriber to which the network signaling message relates, at least one database message address associated with the mobile subscriber identified by the network signaling message and authenticating the received network signaling message by comparing the message address of the routeing part and the message address of the instruction part with the at least one database message address.

2. The network entity of claim 1, wherein the routeing part uses a Signalling Connection Control Part, SCCP, protocol.

3. The network entity of claim 1, wherein the verification logic is configured to provide a pass output if the received network signaling message is authenticated and to provide a fail output if the received supplementary service message is not authenticated.

4. The network entity of claim 1, wherein the at least one database message address comprises an address for a visitor registration entity with which the identified mobile subscriber is registered.

5. The network entity of claim 3, wherein the message processor is configured to discard the received network signaling message if the verification logic provides a fail output.

6. The network entity of claim 5, wherein the message processor is configured to send a failure message to the message address of the routeing part of the received network signaling message if the verification logic provides a fail output.

7. The network entity of claim 1, wherein the network signaling message is an interrogation message for a home registration entity of the PLMN.

8. The network entity of claim 1, wherein the network entity is a Home Location Register, HLR.

9. A method for handling a received network signaling message in a Public Land Mobile Network, PLMN, the network signaling message comprising a routeing part and an instruction part, each of the routeing part and the instruction part including a respective message address therewithin, the method comprising:
   authenticating the received network signaling message based on the respective message address included within the routeing part of the network signaling message and the respective message address included within the instruction part of the network signaling message to determine whether the network signaling message is an imitation; and
   processing the received supplementary service message based on the authentication, and
   wherein the routeing part and the instruction part are on different layers of a protocol stack,
   wherein the instruction part of the supplementary service message uses a Transaction Capabilities Application Part, TCAP, protocol, and
   wherein authenticating the received network signaling message comprises at least one of:
      authenticating the received network signaling message by comparing the message address included within the routeing part with the message address included within the instruction part, and
      determining, where the network signaling message identifies a mobile subscriber to which the network signaling message relates, at least one database message address associated with the mobile subscriber identified by the network signaling message and authenticating the received network signaling message by comparing the message address of the routeing part and the message address of the instruction part with the at least one database message address.

10. The method of claim 9, further comprising, prior to the step of authenticating:
    receiving a signalling request message, comprising a first identifier for a mobile subscriber;
    determining further information in respect to the mobile subscriber identified by the first identifier; and
    communicating the determined further information to an originator of the received signalling request message.

11. The method of claim 10, wherein the further information comprises one or both of: a second identifier for the mobile subscriber identified by the first identifier; and an address for a visitor registration entity with which the mobile subscriber identified by the first identifier is registered.

12. A non-transitory computer-readable storage medium comprising computer-executable program code stored thereon that is executable by a processor to perform the method of claim 10.

* * * * *